United States Patent
Arata et al.

(10) Patent No.: US 11,325,510 B2
(45) Date of Patent: May 10, 2022

(54) VEHICLE SEAT EQUIPPED WITH AIR CONDITIONING FUNCTION

(71) Applicant: TACHI-S CO., LTD., Akishima (JP)

(72) Inventors: Kazuyoshi Arata, Akishima (JP); Takao Tsutsui, Akishima (JP)

(73) Assignee: TACHI-S CO., LTD., Tokyo (JP)

( * ) Notice: Subject to any disclaimer, the term of this patent is extended or adjusted under 35 U.S.C. 154(b) by 752 days.

(21) Appl. No.: 16/304,282

(22) PCT Filed: May 11, 2017

(86) PCT No.: PCT/JP2017/017788
§ 371 (c)(1),
(2) Date: Nov. 24, 2018

(87) PCT Pub. No.: WO2018/042769
PCT Pub. Date: Mar. 8, 2018

(65) Prior Publication Data
US 2019/0092197 A1 Mar. 28, 2019

(30) Foreign Application Priority Data
Sep. 1, 2016 (JP) .............................. JP2016-170418

(51) Int. Cl.
*B60N 2/56* (2006.01)
*B60N 2/22* (2006.01)

(52) U.S. Cl.
CPC .............. *B60N 2/5657* (2013.01); *B60N 2/22* (2013.01); *B60N 2/565* (2013.01); *B60N 2/5635* (2013.01)

(58) Field of Classification Search
CPC ..... B60N 2/5621; B60N 2/5657; B60N 2/565
See application file for complete search history.

(56) References Cited

U.S. PATENT DOCUMENTS

| | | | |
|---|---|---|---|
| 6,179,706 B1 * | 1/2001 | Yoshinori | B60N 2/5635 297/180.14 |
| 2015/0140915 A1 | 5/2015 | Rawlinson | |

(Continued)

FOREIGN PATENT DOCUMENTS

| | | | | |
|---|---|---|---|---|
| CN | 112622717 A | * | 4/2021 | |
| DE | 202017107870 U1 | * | 3/2019 | B60N 2/5628 |

(Continued)

OTHER PUBLICATIONS

International Search Report from International Patent Application No. PCT/JP2017/017788, dated Jul. 25, 2017.

*Primary Examiner* — Timothy J Brindley
(74) *Attorney, Agent, or Firm* — SGPatents PLLC (57) ABSTRACT

In order to make it possible to deal with the states of a seatback from an upright state to a fully reclined state without degrading performance of blowing air from a fan, attached to a seat cushion-side, toward the seatback-side, this vehicle seat having an air conditioning function, is configured to be provided with: an air conditioning fan; fan side piping which is connected with the fan; and seat cushion or seatback side piping which is connected with an air flow passage formed in the seat cushion or the seatback, wherein the fan side piping and the seat cushion or seatback side piping are coupled together slidably in a state where an end of one is partially inserted into an end of the other, and at least one piping of either the fan side pining or the seat cushion or seatback side piping is equipped with a bellows structure.

4 Claims, 6 Drawing Sheets

(56) References Cited

U.S. PATENT DOCUMENTS

2020/0317097 A1* 10/2020 Lim ......................... B32B 3/02
2021/0101509 A1* 4/2021 Hoshi .................. B60N 2/5635

FOREIGN PATENT DOCUMENTS

| | | | | |
|---|---|---|---|---|
| JP | 59-155443 | U | 10/1984 | |
| JP | 60-142659 | U | 9/1985 | |
| JP | 2002-225539 | A | 8/2002 | |
| JP | 2010-036752 | A | 2/2010 | |
| JP | 2015-098318 | A | 5/2015 | |
| KR | 101208756 | B1 * | 12/2012 | |
| WO | WO-2015059894 | A1 * | 4/2015 | ........... B60N 2/5628 |
| WO | WO-2021054743 | A1 * | 3/2021 | ............... B60H 1/00 |

* cited by examiner

VEHICLE SEAT EQUIPPED WITH AIR CONDITIONING FUNCTION

TECHNICAL FIELD

The present invention relates to a vehicle seat equipped with an air conditioning function.

BACKGROUND ART

In regard to the vehicle seat equipped with the air conditioning function, for example, in claim 2 of Japanese Patent Application Laid-Open No. 2002-225539, "A duct structure of a vehicle seat characterized in that in the duct structure of the vehicle seat that an air conditioning device is coupled to a duct, the duct has a seat cushion side duct or a seatback side dust, the vehicle seat has a rotationally adjustable side support section, a bellows-like duct is provided between the inner side of the side support section and a side part of a seat main section, and the seat cushion side duct or the seatback side duct of the air conditioning device and the bellows-like duct are coupled together" is described.

CITATION LIST

Patent Literature

PTL 1: Japanese Patent Application Laid-Open No. 2002-225539

SUMMARY OF INVENTION

Technical Problem

The bellows-like duct described in PTL 1 is attached to the side of the seat cushion and is stretched around from the fan over the almost entire length of the seatback. In such a bellows structure, in order to make it cope therewith from when the back seat has been put up until when it has been the most reclined, the bellows enter a greatly warped state in a state of reclining the seatback.

When trying to house the greatly warped bellows in a comparatively narrow space on the lower side of a connection part between the seat cushion and the seatback, there is the possibility that part of the greatly warped bellows may be crushed.

When the part of the greatly warped bellows is crushed in this way, an air sending resistance in the bellows is increased and there is the possibility that air sending performance may be degraded.

The present invention solves the above-described related art issue and provides a vehicle seat equipped with an air conditioning function which is able to cope with states from a state where the seatback is put up to a state where it is the most reclined without degrading the performance of sending air from the fan which is attached to the side of the seat cushion to the side of the seatback or without degrading performance of sending air reversely from the fan which is attached to the side of the seatback to the side of the seat cushion.

Solution to Problem

In order to solve the above-described problem, in the present invention, in a vehicle seat having seat cushion, seatback and headrest and equipped with the air conditioning function, it was configured by being equipped with an air conditioning fan, fan side piping which is connected with the fan and seat cushion or seatback side piping which is connected with an air flow passage formed in the seat cushion or the seatback, in which the fan side piping and the sea cushion or seatback side piping are coupled together slidably in a state where an end of one is partially inserted into an end of the other, and at least one piping of either the fan side pining or the seat cushion or seatback side piping is equipped with a bellows structure.

Advantageous Effects of Invention

According to the present invention, it is possible to provide the vehicle seat equipped with the air conditioning function which is able to cope with the states from the state where the seatback is put up to the state where it is the most reclined without degrading the performance of sending air from the fan which is attached to the side of the seat cushion to the side of the back seat or without degrading the performance of sending air reversely from the fan which is attached to the side of the seatback to the side of the seat cushion.

DESCRIPTION OF EMBODIMENTS

The present invention is the one configured by being equipped with, in a vehicle seat which is equipped with a reclining function of adjusting an angle of a seatback and an air conditioning function, an air conditioning fan, fan side piping which is connected with the fan and seat cushion or seatback side piping which is connected with an air flow passage formed in the seat cushion or the seatback, in which the fan side piping and the seat cushion or seatback side piping are coupled together slidably in a state where an end of one is partially inserted into an end of the other and at least one piping of either the fan side piping or the seat cushion or seatback side piping is equipped with a bellows structure.

Then, it is the one configured in such a manner that in changes in position of the fan side piping and the seat cushion or seatback side piping which occur by a change in positional relation between a part of the fan side piping which is connected with the fan and a part of the seat cushion or seatback side piping which is connected with the air flow passage when the seatback is the most put up and when the seatback is the most reclined by the reclining function, a change in compression-direction position is absorbed by sliding the fan side piping and the seat cushion or seatback side piping which are coupled together slidably, and in the changes in position, a change in bending-direction position is absorbed by the bellows structure which is provided on at least one piping of either the fan side piping or the seat cushion or seatback side piping.

In all the drawings for describing present examples, the same numeral is assigned to the one having the same function and repetitive description thereof is omitted in principle. In the following, examples of the present invention will be described in detail on the basis of the drawings. However, the present invention shall not be construed by being limited to contents described in examples which will be described in the following. A person skilled in the art would readily understand that it is possible to alter a specific configuration thereof within the range not deviating from the idea or the gist of the present invention.

Example 1

A first embodiment of the present invention will be described by using FIG. 1 to FIG. 6.

Figure 1:
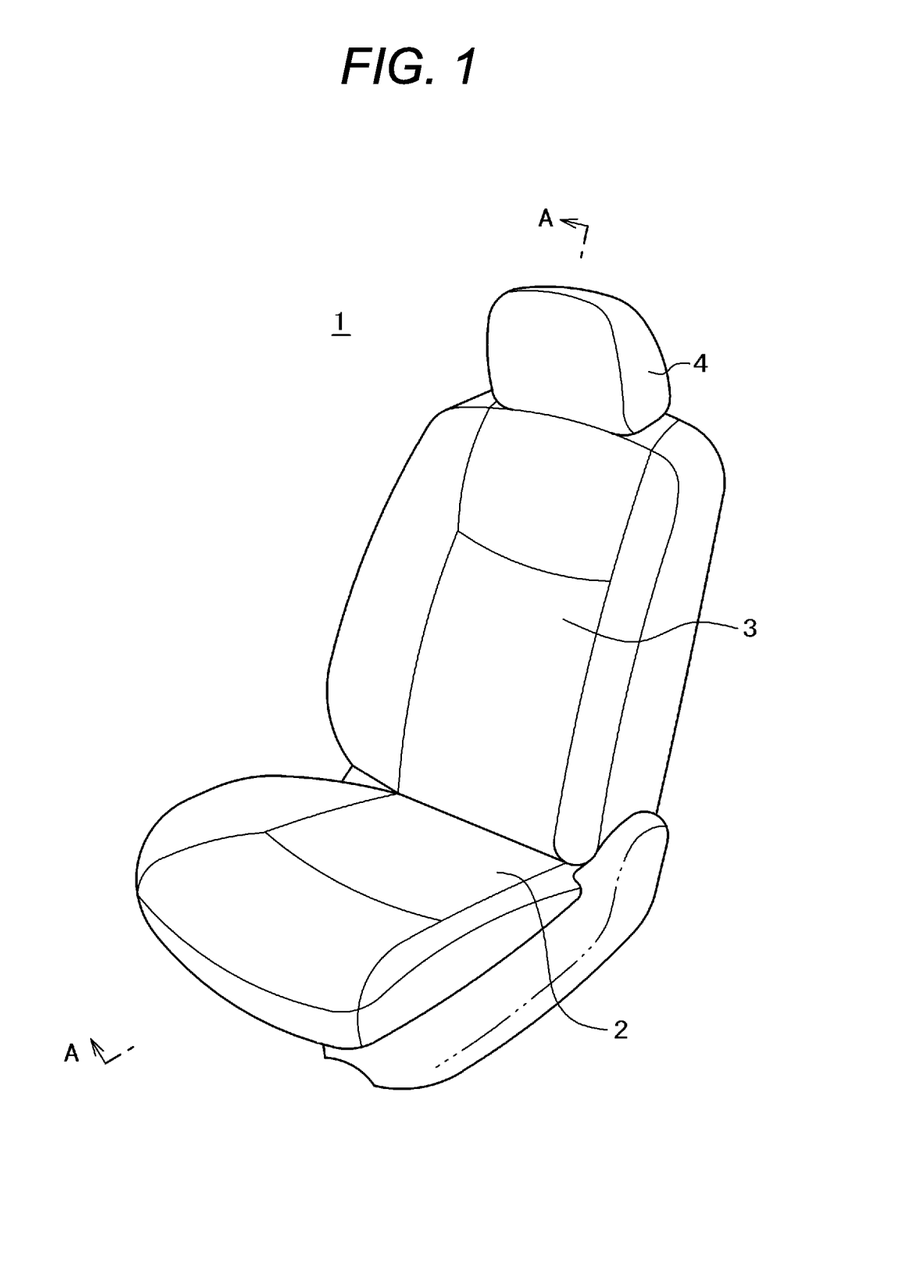
FIG. 1 is a perspective view illustrating the outside appearance of a vehicle seat according to Example 1 of the present invention.

FIG. 1 is a perspective view illustrating the external appearance of a vehicle seat 1 according to the present example. The vehicle seat 1 according to the present example is configured by being equipped with a seat cushion 2 on which a passenger will sit, a seatback 3 on which the passenger who sits down will lean his/her back and a headrest 4 adapted to support the head of the passenger.

Figure 2:
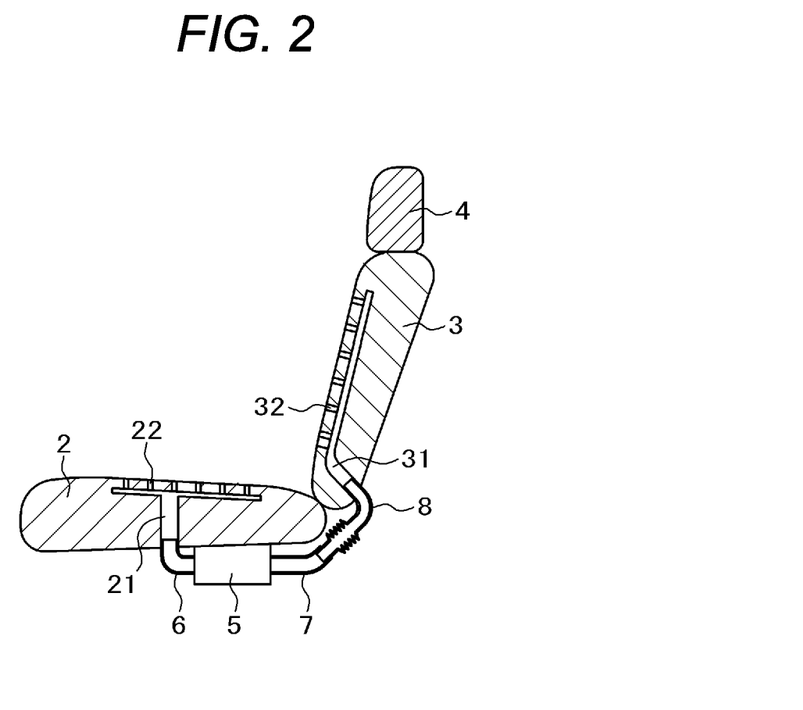
FIG. 2 relates to the vehicle seat according to Example 1 of the present invention and is a sectional diagram illustrating an A-A cross section in FIG. 1.

FIG. 2 is a diagram of an A-A cross section in FIG. 1. However, illustration of a detailed configuration is omitted.

In the configuration illustrated in FIG. 2, 5 is a fan and it is attached to a lower surface of the seat cushion 2. 6 is piping (seat cushion side piping) which connects the fan 5 with an air flow passage 21 in the seat cushion and air which is sent from the fan 5 and is sent to the air flow passage 21 through the piping (the seat cushion side piping) 6 is discharged from a surface of the seat cushion 2 through air flow holes 22 which are formed between the air flow passage 21 and the surface of the seat cushion 2.

7 is piping (fan side piping) adapted to send the air sent from the fan 5 to the side of the seatback 3 and it is connected with piping 8 which is piping on the seatback side. The air which is sent from the fan 5 and is sent to the side of the seatback 3 through the piping (the fan side piping) 7 and the piping (the seatback side piping) 8 is sent into an air flow passage 31 formed in the seatback 3 and is discharged from a surface of the seatback 3 through air flow holes 32 which are formed ranging from the air flow passage 31 to the surface side of the seatback 3.

Figure 3:
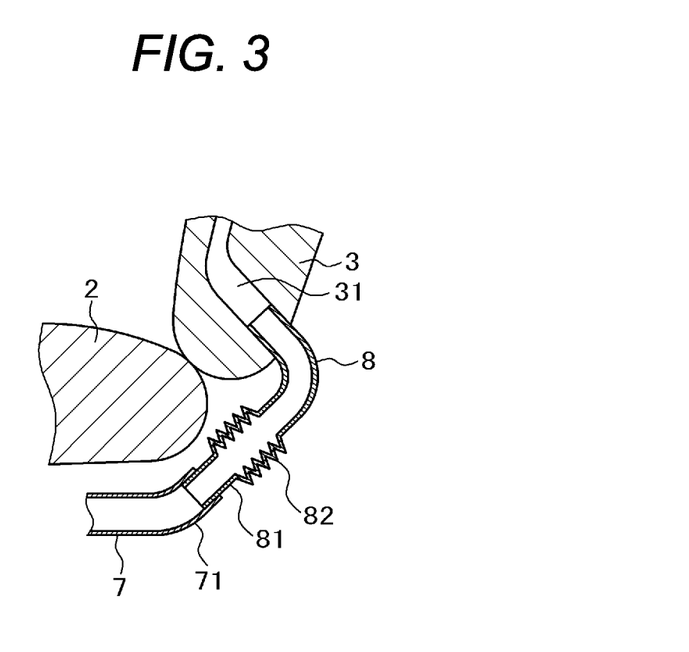
FIG. 3 is a sectional diagram illustrating a connection part of piping in FIG. 2 of the vehicle seat according to Example 1 of the present invention in an enlarged form.

An enlarged diagram of a connection part between the piping 7 on the side of the fan 5 and the piping 8 on the side of the seatback 3 is illustrated in FIG. 3. Bellows 82 are formed on the piping 8 and the leading end side (a leading end part) 81 which is located ahead of it is inserted into a leading end part 71 which is located near a leading end of the piping 7. That is, an outer diameter dimension of the leading end part 81 of the piping 8 is formed slightly smaller than an inner diameter dimension of the leading end part 71 of the piping 7. The leading end part 71 of the piping 7 and the leading end part 81 of the piping 8 are linearly formed respectively and are configured in such a manner that the leading end part 81 of the piping 8 which is inserted into the leading end part 71 of the piping 7 is able to move back and forth along the leading end part 71 of the piping 7.

Figure 4:
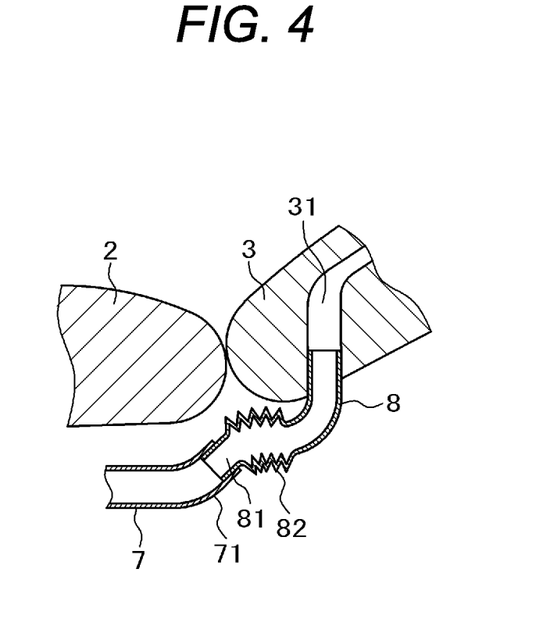
FIG. 4 is a sectional diagram illustrating a part corresponding to the connection part of the piping in FIG. 2 in a state where a seatback is reclined by a reclining function in the vehicle seat according to Example 1 of the present invention in the enlarged form.

A state where the seatback 3 is reclined is illustrated in FIG. 4. When compared with a state of putting the seatback 3 up which is illustrated in FIG. 3, a positional relation between the piping 7 which is fixed to the fan 5 and the piping 8 which is fixed to the air flow passage 31 of the seatback 3 deviates. That is, a distance between the piping 7 and the piping 8 becomes short and a height of the piping 8 relative to the piping 7 changes. Thereby, compressing force (a compressive stress) and bending force (a bending stress) act between the piping 7 and the piping 8.

In the configuration of the present example, it is possible to absorb the compressive stress which is generated due to an axial-direction positional deviation between the piping 7 and the piping 8 by movement of the leading end part 81 of the piping 8 which is inserted into the leading end part 71 of the piping 7 in a front-back direction (a direction of a central axis of the leading end part 71 of the piping 7) along the leading end part 71 of the piping 7. In addition, it is possible to absorb the bending stress which is generated due to a positional deviation of the piping 8 relative to the piping 7 in a direction which is different from the axial direction by bending of the bellows 82 on the piping 8.

That is, in the conventional structure, deviations in distance from the fan 5 to the piping 8 which is fixed to the air flow passage 31 of the seatback 3 and in height direction thereof which occur by reclining and putting up the seatback 3 have been absorbed only by a bellows-like duct. In contrast, in the present example, as described above, it was made so as to absorb the change in distance by front-back-direction movement of the leading end part 81 of the piping 8 which is inserted into the leading end part 71 of the piping 7.

It became possible to form the piping 7 and the piping 8 using a nylon-based or polypropylene-based hard resin which is comparatively low in price in comparison with a soft resin also including the bellows 82 by configuring in this way.

Thereby, in the configuration indicated in the present example, force which would crush the bellows 82 is not imposed on them and it becomes possible to avoid occurrence of such a defect that air flowing performance of the seatback 3 is degraded for the reason that the bellows 82 are crushed and thereby the air flow passage becomes narrow.

Incidentally, in the configurations illustrated in FIG. 3 and FIG. 4, a state where the leading end part 71 of the piping 7 and the leading end part 81 of the piping 8 are straight straight-pipes respectively is illustrated. However, they may be curved pipes that center lines of the respective pipes have the same radius of curvature, that is, bent pipes.

In addition, in the configurations illustrated in FIG. 3 and FIG. 4, the configurations that the leading end part 81 of the piping 8 is inserted into the leading end part 71 of the piping 7 are illustrated. However, a configuration that the leading end part 71 of the piping 7 is inserted into the leading end part 81 of the piping 8 conversely may also be preferable.

Figure 5:
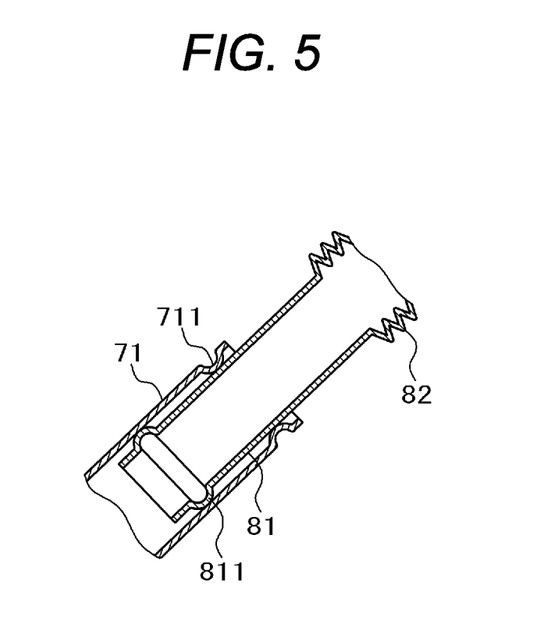
FIG. 5 is a sectional diagram of a piping connection part illustrating one modification of the connection part of the piping in the vehicle seat according to Example 1 of the present invention.

A state where the leading end part 81 of the piping 8 is inserted into the leading end part 71 of the piping 7 is illustrated in FIG. 5 in the enlarged form as one modification of the leading end part 71 of the piping 7 and the leading end part 81 of the piping 8. In the present modification, a projection 711 which is in contact with the leading end part 81 of the piping 8 is formed over the whole periphery of the leading end part 71 of the piping 7. On the other hand, a projection 811 which is in contact with the leading end part 71 of the piping 7 is formed over the whole periphery of the leading end part 81 of the piping 8.

Since the projections 711 and 811 are in contact with the leading end part 71 of the piping 7 or the leading end part 81 of the piping 8 over the entire peripheries respectively in this way, airtightness in the piping 7 and the piping 8 is maintained. Thereby, it is possible to send the air which is sent from the fan 5 into the air flow passage 31 in the seatback 3 through the piping 7 and the piping 8 with no leakage to the outside.

Incidentally, in the configuration illustrated in FIG. 5, the configuration that the projection 711 is formed on the leading end part 71 of the piping 7 and the projection 811 is formed on the leading end part 81 of the piping 8 is illustrated. However, a configuration that the projection is provided on one of them may also be preferable.

Figure 6:
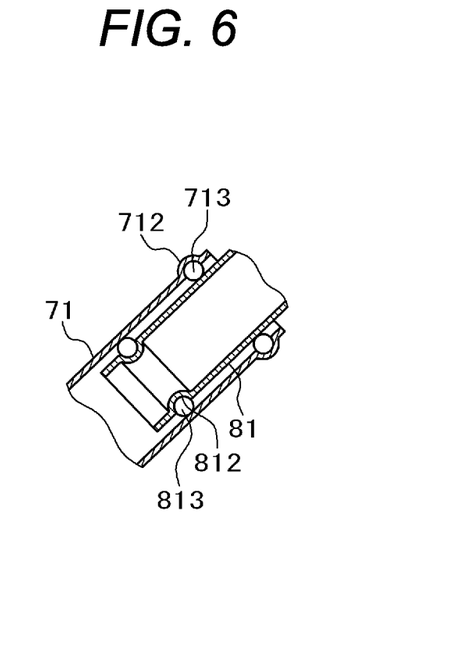
FIG. 6 is a sectional diagram of a piping connection part illustrating another modification of the connection part of the piping in the vehicle seat according to Example 1 of the present invention.

In addition, a state where the leading end part 81 of the piping 8 is inserted into the leading end part 71 of the piping 7 is illustrated in FIG. 6 in the enlarged form as another modification of the leading end part 71 of the piping 7 and the leading end part 81 of the piping 8. In the present modification, a recess 712 is formed in the leading end part 71 of the piping 7 and a seal 713 is fitted into the recess 712 and is in contact with the leading end part 81 of the piping 8. On the other hand, a recess 812 is formed in the leading end part 81 of the piping 8 and a seal 813 is fitted into the recess 812 and is in contact with the leading end part 71 of the piping 7.

Since the seal 713 which is fitted into the recess 712 and the seal 813 which is fitted into the recess 812 are in contact with the leading end part 71 of the piping 7 or the leading end part 81 of the piping 8 over the whole peripheries respectively, the airtightness in the piping 7 and the piping 8 is maintained. Thereby, it is possible to send the air which is sent from the fan 5 into the air flow passage 31 in the seatback 3 through the piping 7 and the piping 8 with no leakage to the outside.

Incidentally, in the configuration illustrated in FIG. 6, the configuration that the recess 712 is formed in the leading end part 71 of the piping 7 and the seal 713 is fitted thereinto and the recess 812 is formed in the leading end part 81 of the piping 8 and the seal 813 is fitted thereinto is illustrated. However, a configuration that the recess is formed in one of them and the seal is fitted thereinto may also be preferable.

Example 2

In Example 1, the configuration that the bellows 82 are formed on the piping 8 on the seatback side is indicated. On the other hand, in the present example, a configuration that the bellows are formed on the piping 7 on the side of the fan 5 will be described. Configurations of other parts are basically the same as those described in Example 1 and therefore description thereof is omitted.

Figure 7:
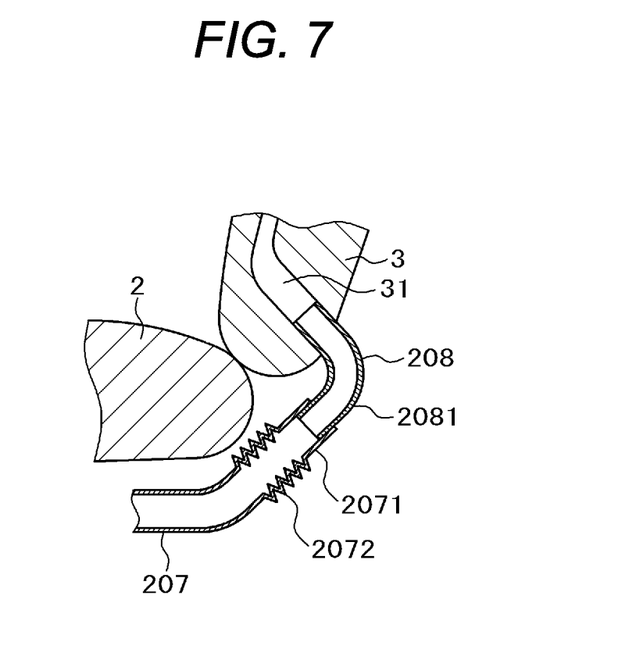
FIG. 7 is a sectional diagram illustrating a connection part of piping of a vehicle seat according to Example 2 of the present invention in the enlarged form.

A diagram that a connection part between piping (fan side piping) 207 on the side of the fan 5 (see FIG. 2) and piping 208 on the side of the seatback 3 in the present example is enlarged is illustrated in FIG. 7. Bellows 2072 are formed on the piping 207 on the side of the fan 5 and a leading end part 2081 of the piping 208 is inserted into the side of a leading end part 2071 which is located ahead of the bellows 2072.

The leading end part 2071 of the piping 207 and the leading end part 2081 of the piping 208 are linearly formed respectively and are configured in such a manner that the leading end part 2081 of the piping 208 which is inserted into the leading end part 2071 of the piping 207 is able to move in the front-back direction (the axial direction of the leading end part 2071 of the piping 207) along the leading end part 2071 of the piping 207.

Also in the configuration of the present example, similarly to the case of Example 1, it is possible to absorb a change in distance between the piping 207 and the piping 208 by moving the leading end part 2081 of the piping 208 which is inserted into the leading end part 2071 of the piping 7 in the front-back direction along the leading end part 2071 of the piping 207. In addition, it is possible to absorb a change in height of the piping 208 relative to the piping 207 by bending of the bellows 2072 on the piping 207.

That is, in the conventional structure, the deviations in distance from the fan 5 to the piping 208 which is fixed to the air flow passage 31 of the seatback 3 and in height direction thereof which occur by reclining and putting up the seatback 3 have been absorbed only by the bellows-like duct. On the other hand, in the present example, as described above, it is made to absorb the change in distance by front-back-direction movement of the leading end part 2081 of the piping 208 which is inserted into the leading end part 2071 of the piping 207.

Thereby, in the configuration indicated in the present example, the force which would crush the bellows 2072 is not imposed on them and it becomes possible to avoid occurrence of the defect that the air flowing performance of the seatback 3 is degraded for the reason that the bellows 2072 are crushed and thereby the air flow passage becomes narrow.

Incidentally, in the configuration illustrated in FIG. 7, a state where the leading end part 2071 of the piping 207 and the leading end part 2081 of the piping 208 are straight straight-pipes respectively is illustrated. However, they may be curved pipes that the center lines of the respective pipes have the same radius of curvature, that is, bent pipes.

In addition, also in the present example, similarly to the ones described in FIG. 5 and FIG. 6 in Example 1, it is possible to adopt modifications of the leading end part 2071 of the piping 207 and the leading end part 2081 of the piping 208.

Example 3

As a third embodiment of the present invention, a configuration that the configuration described in Example 1 that the bellows 82 are formed on the piping 8 on the seatback side is combined with the configuration described in Example 2 that the bellows 2072 are formed on the piping 207 on the side of the fan 5 will be described using FIG. 8.

Figure 8:
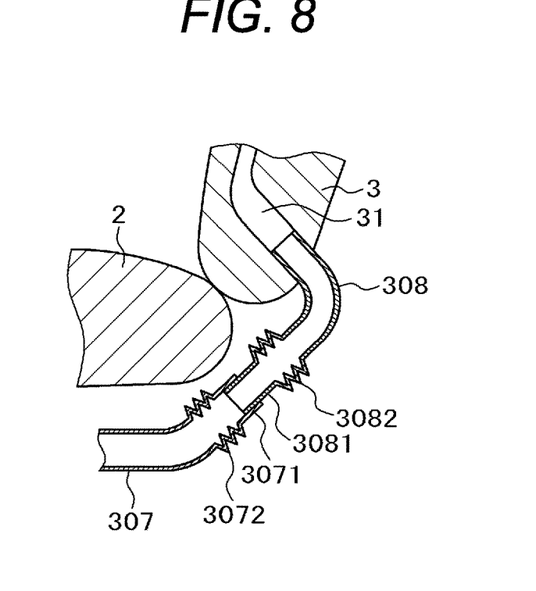
FIG. 8 is a sectional diagram illustrating a connection part of piping of a vehicle seat according to Example 3 of the present invention in the enlarged form.

The configuration illustrated in FIG. 8 is a diagram which corresponds to the configuration illustrated in FIG. 3 in Example 1 and the configuration illustrated in FIG. 7 in Example 2 and it illustrates a connection part between piping (fan side piping) 307 on the side of the fan 5 (see FIG. 2) and piping (seatback side piping) 308 on the side of the seatback 3.

Similarly to the one described in Example 2, bellows 3072 are formed on the piping 307 on the side of the fan 5 and it has a leading end part 3071. In addition, similarly to the one described in Example 1, bellows 3082 are formed on the piping 308 on the side of the seatback 3 and it has a leading end part 3081. Then, the leading end part 3081 of the piping 308 is inserted into the leading end part 3071 of the piping 307.

The leading end part 3071 of the piping 307 and the leading end part 3081 of the piping 308 are linearly formed respectively and are configured in such a manner that the leading end part 3081 of the piping 308 which is inserted into the leading end part 3071 of the piping 307 is able to move in the front-back direction (the axial direction of the leading end part 3071 of the piping 307) along the leading end part 3071 of the piping 307.

Also in the configuration of the present example, similarly to the cases of Example 1 and Example 2, it is possible to absorb a change in distance between the piping 307 and the piping 308 which occurs by reclining and putting up the seatback 3 by moving the leading end part 3081 of the piping 308 which is inserted into the leading end part 3071 of the piping 307 in the front-back direction along the leading end part 3071 of the piping 307. In addition, it is possible to absorb a change in height of the piping 308 relative to the piping 307 by bending the bellows 3072 on the piping 307 and the bellows 3082 on the piping 308 respectively.

That is, in the conventional structure, the deviations in distance from the fan 5 to the piping 308 which is fixed to the air flow passage 31 of the seatback 3 and in height direction thereof which occur by reclining and putting up the seatback 3 have been absorbed only by the bellows-like duct. On the other hand, in the present example, it is made to absorb the change in distance by front-back-direction movement of the leading end part 3081 of the piping 308 which is inserted into the leading end part 3071 of the piping 307 as described above.

Thereby, in the configuration indicated in the present example, the force which would crush the bellows 3072 and 3082 is not imposed on them and it becomes possible to avoid occurrence of such a defect that the air flowing performance of the seatback 3 is degraded for the reason that the bellows 3072 and/or 3082 are crushed and thereby the air flow passage becomes narrow.

Incidentally, in the configuration illustrated FIG. 8, a state where the leading end part 3071 of the piping 307 and the leading end part 3081 of the piping 308 are straight straight-pipes respectively is illustrated. However, they may be curved pipes that the center lines of the respective pipes have the same radius of curvature, that is, bent pipes.

In addition, also in the present example, similarly to the ones described in FIG. 5 and FIG. 6 in Example 1, it is possible to adopt modifications of the leading end part 3071 of the piping 307 and the leading end part 3081 of the piping 308.

Example 4

In Examples 1 to 3, the configuration such as that illustrated in FIG. 2, that is, the configuration that the fan 5 is disposed on the lower part of the seat cushion 2 and the air which is sent from the fan 5 is sent out also to the side of the seatback 3 was described. In contrast, in the present example, a configuration that a fan is provided on the side of a seatback so as to send air which is sent from the fan out to the side of a seat cushion will be described.

Figure 9:
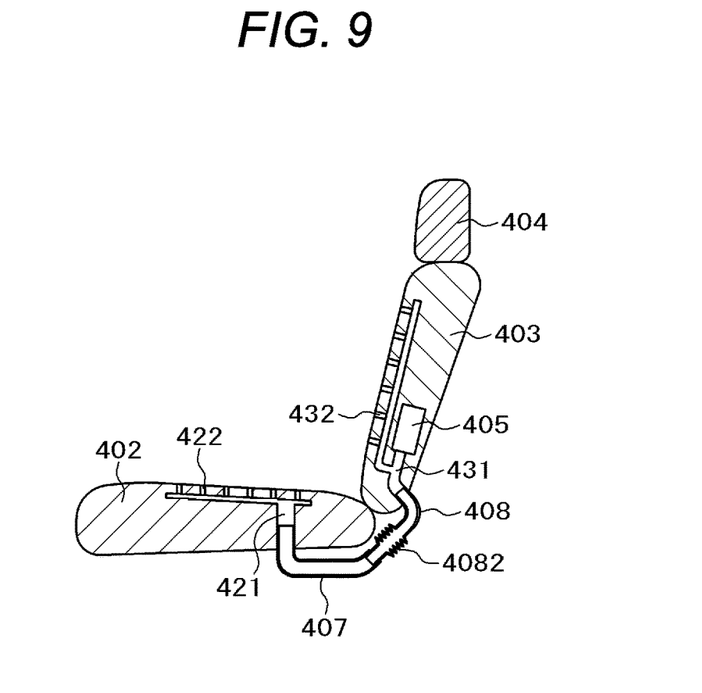
FIG. 9 is a sectional diagram illustrating a connection part of piping of a vehicle seat according to Example 4 of the present invention in the enlarged form.

A sectional diagram of a vehicle seat according to the present example which corresponds to that in FIG. 2 is illustrated in FIG. 9.

In the configuration illustrated in FIG. 9, 405 is a fan and it is attached to the inside of a seatback 403. Air which is sent from the fan 405 flows from an air flow passage 4031 and is partially discharged from a surface of the seatback 403 through air flow holes 432. The rest of the air which is sent from the fan 405 is sent to piping 407 on the side of the seat cushion 402 through piping 408 on the side of the seatback 403, passes through an air flow passage 421 formed on the side of a seat cushion 402 and is discharged to a surface of the seat cushion 402 through air flow holes 422.

In such a configuration, bellows 4082 are formed on the piping 408 on the side of the seat cushion 403 and a connection part between the piping 408 and the piping 407 on the side of the seat cushion 402 has a configuration such as that illustrated in FIG. 3 and described in Example 1.

It is possible to obtain the effect which is equivalent to that described in Example 1 also in the configuration of the connection part between pieces of the piping 407 and 408 in the present example.

In addition, it is also possible to apply the Modifications 1 and 2 described in Example 1 to the present example.

Example 5

An example that the present invention is applied to a vehicle seat having a function of adjusting a height of a seat cushion will be described as Example 5.

Figure 10:
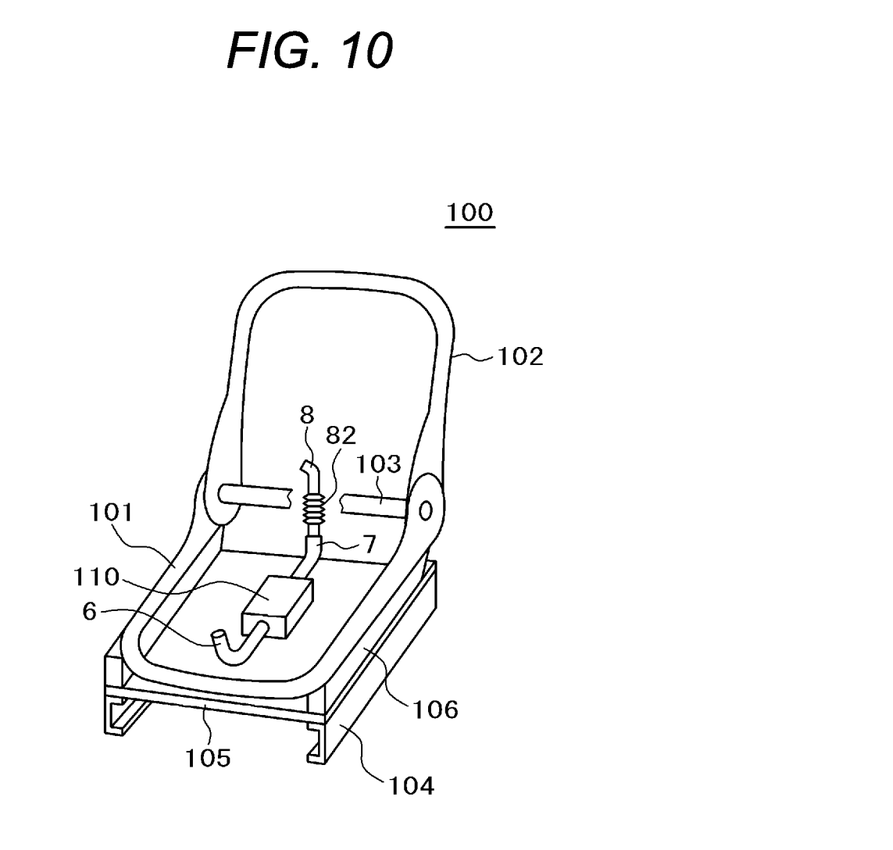
FIG. 10 is a perspective view of a frame illustrating a relation among a frame structure, an air conditioning fan and the piping of the vehicle seat according to Example 4 of the present invention.

FIG. 10 illustrates a frame configuration 100 which is in a state where the cushion of the vehicle seat illustrated in FIG. 1 is detached.

101 is a frame on the seat cushion side, 102 is a frame on the seatback side and they are connected with each other by a coupling rod 103. 104 is a fixed rail and it is fixed to a floor surface of a vehicle. 105 is a plate which is fixed to a not illustrated movable rail and it moves in the front-back direction along the fixed rail 104 together with the movable rail. 106 is a height adjustment mechanism and it adjusts a height of the frame 101 on the seat cushion side.

In such a configuration, a fan 110 (corresponding to the fan 5 in Example 1) is attached to the plate 105, the piping 6 extends from the fan 110 to the side of the frame 101 on the seat cushion side and the piping 7 and the piping 8 extend to the side of the frame 102 on the seatback side.

In such a configuration, change amounts of the distance and the mutual positional relation between the piping 8 which has been fixed to the seatback side and the piping 7 which is fixed to the side of the fan 110 in a state where the frame 102 on the seatback side is put up as illustrated in FIG. 10 and a state where the frame 102 on the seatback side is reclined by a not illustrated reclining seat mechanism are made different depending on the height of the frame 101 on the seat cushion side. That is, ways of changing the distance and the positional relation between pieces of the piping 7 and 8 vary by adjusting the height of the frame 101 on the seat cushion side by the height adjustment mechanism 106.

In such a state, in the configuration of the present example, as described in Example 1, in regard to the matter that the distance between the piping 7 and the piping 8 changes, it is possible to absorb it by moving the leading end part 81 of the piping 8 which is inserted into the leading end part 71 of the piping 7 in the front-back direction (the central axis direction of the leading end part 71 of the piping 7, see FIG. 3 and FIG. 4) along the leading end part 71 of the piping 7. In addition, it is possible to absorb the change in height of the piping 8 relative to the piping 7 by bending the bellows 82 of the piping 8.

That is, in regard to the deviations in distance from the fan 5 to the piping 8 which is fixed to the air flow passage 31 of the seatback 3 and in height direction thereof which occur by reclining and putting up the seatback 3 in the state where the height of the seat cushion 2 has been changed, it is possible to absorb the change in distance by front-back-direction movement of the leading end part 81 of the piping 8 which has been inserted into the leading end part 71 of the piping 7.

Thereby, in the configuration indicated in the present example, the force which would crush the bellows 82 is not imposed on them and it becomes possible to avoid occurrence of the defect that the air flowing performance of the seatback 3 is degraded for the reason that the bellows 82 are crushed and thereby the air flow passage becomes narrow.

Incidentally, it is possible to apply the configurations of Modification 1 and 2 described in Example 1 to the present example. Further, it is also possible to apply the configurations described in Examples 2 and 3 to the present example.

REFERENCE SIGNS LIST

1 . . . vehicle seat, 2 . . . seat cushion, 3 . . . seatback, 4 . . . headrest, 5 . . . fan, 6 . . . seat cushion side piping, 7, 207, 307 . . . fan side piping, 8 . . . seatback side piping, 71, 81, 2071, 2081, 3071, 3081 . . . leading end part, 82, 2072, 3072, 3082, 4082 . . . bellows.

The invention claimed is:

1. A vehicle seat having a seat cushion, a seatback, and a headrest and equipped with an air conditioning function, comprising:
  an air conditioning fan;
  fan side piping which is connected with the fan; and
  seat cushion or seatback side piping which is connected with an air flow passage formed in the seat cushion or the seatback,
  wherein the fan side piping and the seat cushion or seatback side piping are coupled together slidably in a state where an end of the one is partially inserted into an end of the other,
  wherein at least one piping of either the fan side piping or the seat cushion or seatback side piping is equipped with a bellows structure,
  wherein the vehicle seat has a reclining function of adjusting an angle of the seatback, such that changes in positional relation between the fan side piping and the seat cushion or seatback side piping occur by a change in positional relation between a part of the fan side piping which is connected with the fan and a part of the seat cushion or seatback side piping which is connected with the air flow passage when the seatback is the most put up and when the seatback is the most reclined by the reclining function, and
  wherein a change in compression-direction positional relation between the fan side piping and the seat cushion or seatback side piping is absorbed by sliding the fan side piping and the seat cushion or seatback side piping which are coupled together slidably, and a change in bending-direction positional relation between the fan side piping and the seat cushion or seatback side piping is absorbed by the bellows structure which is provided on at least one piping of either the fan side piping or the seat cushion or seatback side piping.

2. The vehicle seat equipped with the air conditioning function according to claim 1, wherein a projection which is adapted to keep the inside of the piping which is connected with the fan and the inside of the piping which is connected with the seat cushion or the seatback airtight from the outside is formed on a part where the end of one is partially inserted into the end of the other in the piping which is connected with the fan and the piping which is connected with the seat cushion or the seatback.

3. The vehicle seat equipped with the air conditioning function according to claim 1, wherein a seal which is adapted to keep the inside of the piping which is connected with the fan and the inside of the piping which is connected with the seat cushion or the seatback airtight from the outside is inserted into a part where the one is partially inserted into the other in the piping which is connected with the fan and the piping which is connected with the seat cushion or the seatback.

4. The vehicle seat equipped with the air conditioning function according to claim 1, wherein the piping which is connected with the fan and the piping which is connected with the seat cushion or the seatback are formed with a hard resin.

\* \* \* \* \*